US012799923B2

(12) United States Patent
Redin et al.

(10) Patent No.: US 12,799,923 B2
(45) Date of Patent: Nov. 17, 2026

(54) COUPLING ASSEMBLY

(71) Applicant: Siemens Gamesa Renewable Energy Innovation & Technology, S.L., Sarriguren (ES)

(72) Inventors: Juan Redin, Titusville, FL (US); Carlos Jesus Salvatierra Macua, Beriain (ES)

(73) Assignee: Siemens Gamesa Renewable Energy Innovation & Technology, S.L., Sarriguren (ES)

( * ) Notice: Subject to any disclaimer, the term of this patent is extended or adjusted under 35 U.S.C. 154(b) by 171 days.

(21) Appl. No.: 18/850,147

(22) PCT Filed: Feb. 14, 2023

(86) PCT No.: PCT/EP2023/053667
§ 371 (c)(1),
(2) Date: Sep. 24, 2024

(87) PCT Pub. No.: WO2023/186394
PCT Pub. Date: Oct. 5, 2023

(65) Prior Publication Data

US 2025/0207560 A1 Jun. 26, 2025

(30) Foreign Application Priority Data

Mar. 30, 2022 (EP) ..................................... 22382304

(51) Int. Cl.
*F03D 15/00* (2016.01)
*F03D 80/70* (2016.01)
(Continued)

(52) U.S. Cl.
CPC ............. *F03D 15/00* (2016.05); *F03D 80/70* (2016.05); *F16C 35/042* (2013.01); *F16D 1/033* (2013.01);
(Continued)

(58) Field of Classification Search
CPC ...... F03D 15/00; F03D 80/70; F05B 2260/30; F05B 2260/4031; F16C 2360/31;
(Continued)

(56) References Cited

U.S. PATENT DOCUMENTS 9,041,237 B2 * 5/2015 Hinken ................... F03D 15/20 290/55
12,234,803 B2 * 2/2025 Österberg ................. F16D 3/76
(Continued)

FOREIGN PATENT DOCUMENTS

CN 110914533 A 3/2020
EP 1855001 A1 11/2007
(Continued)

OTHER PUBLICATIONS

PCT International Search Report and Written Opinion of International Searching Authority mailed Apr. 6, 2023 corresponding to PCT International Application No. PCT/EP2023/053667 filed Feb. 14, 2023.

*Primary Examiner* — Sean Gugger
(74) *Attorney, Agent, or Firm* — Schmeiser Olsen PLLC

(57) ABSTRACT

A torque transmitting coupling assembly for a wind turbine is provided configured to couple a first coupling part to a second coupling part, wherein the first coupling part and the second coupling part are configured to rotate about a longitudinal axis of the torque transmitting coupling assembly, wherein the first coupling part is supported by a first bearing and a second bearing distributed along the longitudinal axis, wherein the first coupling part is enclosed by a bearing housing and the first and second bearings are arranged between the first coupling part and the bearing housing, wherein the second coupling part is enclosed by a second
(Continued)

coupling part housing, wherein the first coupling part and the second coupling part are rigidly coupled by a plurality of fastening means.

15 Claims, 4 Drawing Sheets

(51) Int. Cl.

| | |
|---|---|
| ***F16C 35/04*** | (2006.01) |
| ***F16D 1/033*** | (2006.01) |
| ***F16H 57/021*** | (2012.01) |
| *F16H 57/02* | (2012.01) |

(52) U.S. Cl.
CPC ........ *F16H 57/021* (2013.01); *F05B 2260/30* (2013.01); *F05B 2260/4031* (2013.01); *F16C 2360/31* (2013.01); *F16H 2057/02026* (2013.01); *F16H 2057/02078* (2013.01)

(58) Field of Classification Search
CPC ................... F16C 35/042; F16D 1/033; F16H 2057/02026; F16H 2057/02078; F16H 57/02
See application file for complete search history.

(56) References Cited

U.S. PATENT DOCUMENTS

| | | | |
|---|---|---|---|
| 2013/0221677 | A1 | 8/2013 | Hinken |
| 2014/0378260 | A1 | 12/2014 | Dewar |
| 2016/0061191 | A1 | 3/2016 | Wilson |
| 2019/0024776 | A1 | 1/2019 | Wilson |
| 2019/0048938 | A1 | 2/2019 | Demtröder |
| 2019/0186467 | A1 | 6/2019 | Eusterbarkey |
| 2019/0360403 | A1 | 11/2019 | Swift et al. |

FOREIGN PATENT DOCUMENTS

| | | | |
|---|---|---|---|
| EP | 2075466 | A1 | 7/2009 |
| EP | 3181899 | A1 | 6/2017 |
| EP | 3447282 | A1 | 2/2019 |
| EP | 3798467 | A1 | 3/2021 |
| EP | 3859148 | A1 | 8/2021 |
| GB | 2496256 | A | 5/2013 |
| JP | 6022564 | B2 | 11/2016 |
| WO | 2019022595 | A1 | 1/2019 |
| WO | 2021121493 | A1 | 6/2021 |

* cited by examiner

COUPLING ASSEMBLY

CROSS-REFERENCE TO RELATED APPLICATIONS

This application claims priority to PCT Application No. PCT/EP2023/053667, having a filing date of Feb. 14, 2023, which claims priority to EP application Ser. No. 22382304.8, having a filing date of Mar. 30, 2022, the entire contents both of which are hereby incorporated by reference.

FIELD OF TECHNOLOGY

The following relates to a torque transmitting coupling assembly for a wind turbine configured to couple a first coupling part to a second coupling part. The following further relates to a drive train of a wind turbine.

BACKGROUND

Wind turbines are increasingly used for the generation of electrical energy. A wind turbine comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. Hence, the rotational energy of the blades is transferred to the generator, which then converts the mechanical energy into electricity and transfers the electricity to the electrical grid.

The drivetrain of a wind turbine comprises shaft-to-shaft or hub-to-shaft couplings to couple the components of the drivetrain. For example, the main shaft of the drivetrain between the main bearing and the gearbox is coupled to the gearbox input shaft or to the planet carrier of the gearbox to transfer the torque from the main shaft to the gearbox. The coupling has to be suitable to transfer the torques of the drivetrain of the wind turbine and not all couplings known from the conventional art, such as in the automotive sector, are suited for transferring the torques generated by a wind turbine.

Different shaft-to-shaft or hub-to-shaft couplings are known from the conventional art. For example, a shrink disk can be used for solid shaft arrangements. Alternatively, a bolted joint with friction shim can be used for the coupling. The use of a friction shim reduces the risk of slippage of the coupling members, as the friction shim increases the coefficient of static friction between the two coupled parts. For example, a coated steel shim with partially embedded diamonds can be used as a friction shim. The friction shim is then placed between the two coupling members of the shaft-to-shaft or hub-to-shaft couplings and the diamonds press into the surface of the coupling members to create a microform fit, which leads to a significant friction increase between the coupling members. The use of friction shims allows to transfer higher torques with less slippage risk and is a compact solution, however it is very expensive due to the materials used. Friction shims are used in the automotive sector to couple shafts of the drivetrain.

However, the use of friction shims in wind turbines is very expensive, as the shafts have a much larger diameter and transferred torque compared to the automotive sector. Additionally, friction shims are limited to transmit torque beyond a certain torque density limit. Additionally, the disassembly of friction shims is difficult due to the microform fits.

Alternatively, other frictional couplings such as clamping sets can be used, but their assembly and disassembly are difficult as well.

Torque transmitting couplings for wind turbines are known from the conventional art as well. Document US 2019/0048938 A1 discloses a torque transmitting coupling between two rotatable parts by means of a form-fitted coupling between the two rotatable parts and a compression ring which presses the two rotatable parts together. However, for this coupling, the second rotatable part is arranged at an outer circumferential surface of the first rotatable part. Hence, the second rotatable part is overconstrained so that the first rotatable part fits inside the second rotatable part at the coupling region. Additionally, the torque transmitting region of the coupling is limited by the overlapping surface of both rotatable parts.

The current development of the technology of wind turbines tends to an increased size of wind turbines for harvesting more wind energy, with longer blades and higher towers. Due to the increasing size of wind turbines and the higher loads generated by the wind turbines, higher torques are being transmitted by shafts and couplings in the drivetrain and shafts with a wider diameter are used.

Overconstrained coupling members for the torque transmitting coupling as disclosed in document US 2019/0048938 A1 is disadvantageous due to the increasing size of the drivetrain of newly developed wind turbines. The coupling technique of the drivetrain parts should not present a limiting factor in the dimensioning of the drivetrain components. In other words, the coupling should be adapted so as to present a compact solution to couple shafts or a shaft to a hub without having to modify the dimensions of the coupling members.

A problem of overconstrained coupling members is that misalignments occurring during the rotation of the parts of the coupling assembly result in deformation and shear, as the system is restrained without any degree of freedom left for counteracting against these misalignments, which might result from vibrations in the system or from acceleration or deceleration of the rotating parts. Such deformations can lead to a total failure of the coupling assembly and shorter lifetime of the components.

For coupling assemblies used in wind turbines, one of the mayor design restrictions to an onshore wind turbine comes from the transport, hoisting and logistic limitations on the inland scenario. One of the most restrictive aspects of this frame is the width of the nacelle-limited transportation restrictions, as well as the height.

As the power output of a wind turbine grows, following the market's demands, the gearbox grows with it. The size of the first stage of the gearbox and its ratio is key to a healthy design and it is limited by the width constrain of the nacelle. The gearbox is centered and aligned with the main shaft arrangement on its first stage and this fact constrains passage to an equal value on each side of the gearbox.

SUMMARY

An aspect relates to a torque transmitting coupling assembly which overcomes the problems known form the conventional art.

In addition, an aspect of embodiments of the invention is to provide a classic 4-point drive train of a wind turbine in which the input torque that comes from the rotor and is transferred onto the gearbox, for its transformation to a higher speed, is reacted onto the main structure of the wind turbine.

According to embodiments of the invention, a torque transmitting coupling assembly for a wind turbine comprises a first coupling part and a second coupling part, wherein the torque transmitting coupling assembly is configured to couple the first coupling part to the second coupling part. The first coupling part and the second coupling part are therefore rotatable parts, such as a hub or a shaft.

According to embodiments of the invention, the first coupling part and the second coupling part are configured to rotate about a longitudinal axis of the torque transmitting coupling assembly. For example, if the first coupling part and the second coupling part are shafts, both shafts rotate about the longitudinal axis of the torque transmitting coupling assembly, which is the longitudinal axis of both shafts as well.

According to embodiments of the invention, the first coupling part is supported by a first bearing and a second bearing distributed along the longitudinal axis, wherein the first coupling part is enclosed by a bearing housing and the first and second bearings are arranged between the first coupling part and the bearing housing.

The first and second bearing may be distributed along the longitudinal axis to support the rotation of the first coupling part.

According to embodiments of the invention, the second coupling part is enclosed by a second coupling part housing. The second coupling part housing may support the second coupling part components as well as protect the components housed inside.

According to embodiments of the invention, the first coupling part and the second coupling part are rigidly coupled by a plurality of fastening means. The rigid coupling prevents misalignments after the coupling which might result from the rotation of both the first and the second coupling part, so that the torque can be efficiently transmitted from the first coupling part to the second coupling part.

According to embodiments of the invention, the bearing housing is coupled to the second coupling part housing by a plurality of coupling flanges, wherein each coupling flange is coupled to the bearing housing by a resilient means. Resilient means are means which generate a force between the components coupled by the resilient means depending on the relative position of the components to each other and which have a neutral position at which no force is exerted between the components. The purpose of this coupling is to have a flexible coupling and thereby being able to react to transversal displacements of the second coupling part housing to the bearing housing by providing an additional degree of freedom for the torque transmitting coupling assembly.

The flexible coupling is a reaction mechanism which mitigates the reaction torque caused by acceleration and deceleration of the rotating parts of the torque transmitting coupling assembly by avoiding uncontrolled and undesired transversal displace of the structure of the torque transmitting coupling assembly, in particular of the structure of the bearing housing and of the second coupling part housing. The flexible coupling is configured to react the torque in a tamed and dampened manner, so that the internal and external components of the coupling assembly receive a manageable load transfer.

Hence, the coupling flanges can be seen as reaction torque arms configured to mitigate the reaction forces of the torque transmitting coupling assembly. The reaction is split on the peripherical part of the torque transmitting coupling assembly, thereby reducing parasitic loads to a negligible level.

According to an embodiment of the invention, the bearing housing comprises a yoke for each coupling flange for coupling the coupling flange to the bearing housing. The yoke may protrude from the outer surface of the bearing housing for easing the coupling with the coupling flanges.

According to an embodiment of the invention, the resilient means is a spring, such as a belleville washer, a coil spring or a disc. For example, in an embodiment, the springs are rubber springs.

According to an embodiment of the invention, the resilient means comprises an elastomer. Elastomers are well known resilient means.

According to an embodiment of the invention, the resilient means comprises steel.

According to an embodiment of the invention, the resilient means comprises a plurality of springs.

According to an embodiment of the invention, the plurality of coupling flanges is equally distributed about the circumference of the bearing housing. This is particularly advantageous to distribute the load between all flanges.

According to an embodiment of the invention, the plurality of coupling flanges consists of two flanges. According to an embodiment of the invention, the plurality of coupling flanges consists of three flanges. According to an embodiment of the invention, the plurality of coupling flanges consists of four flanges. According to an embodiment of the invention, the plurality of coupling flanges consists of five flanges. According to an embodiment of the invention, the plurality of coupling flanges consists of six flanges. According to an embodiment of the invention, the plurality of coupling flanges consists of seven flanges. According to an embodiment of the invention, the plurality of coupling flanges consists of eight flanges. According to an embodiment of the invention, the plurality of coupling flanges consists of nine flanges. According to an embodiment of the invention, the plurality of coupling flanges consists of ten flanges. According to an embodiment of the invention, the plurality of coupling flanges consists of eleven flanges. According to an embodiment of the invention, the plurality of coupling flanges consists of twelve flanges. According to an embodiment of the invention, the plurality of coupling flanges consists of thirteen flanges. According to an embodiment of the invention, the plurality of coupling flanges consists of fourteen flanges.

According to an embodiment of the invention, the plurality of coupling flanges comprises at least two flanges. According to an embodiment of the invention, the plurality of coupling flanges comprises at least three flanges. According to an embodiment of the invention, the plurality of coupling flanges comprises at least four flanges. According to an embodiment of the invention, the plurality of coupling flanges comprises at least five flanges. According to an embodiment of the invention, the plurality of coupling flanges comprises at least six flanges. According to an embodiment of the invention, the plurality of coupling flanges comprises at least seven flanges. According to an embodiment of the invention, the plurality of coupling flanges comprises at least eight flanges. According to an embodiment of the invention, the plurality of coupling flanges comprises at least nine flanges. According to an embodiment of the invention, the plurality of coupling flanges comprises at least ten flanges. According to an embodiment of the invention, the plurality of coupling flanges comprises at least eleven flanges. According to an embodiment of the invention, the plurality of coupling flanges comprises at least twelve flanges. According to an embodiment of the invention, the plurality of coupling flanges comprises at least thirteen flanges. According to an embodiment of the invention, the plurality of coupling flanges comprises at least fourteen flanges.

According to an embodiment of the invention, each coupling flange is surrounded at least partially by the respective yoke, wherein the resilient means are arranged at two opposing sides of each coupling flange. For this, the yoke may comprise two yoke flanges extending in radial direction for surrounding the coupling flanges. Hence, both yoke flanges protrude radially outwards from the longitudinal axis, thereby surrounding partially or entirely the respective coupling flange. The resilient means are then arranged at a specific radial distance from the longitudinal axis on both sides of the coupling flange directly facing the yoke flanges. It is also possible to add a third resilient means on the outer radial surface of the coupling flange if the yoke flanges completely surround the coupling flange.

According to an embodiment of the invention, the yokes are formed as an integral part of the bearing housing, which means that the yoke and the bearing housing are formed as a single body. An integral connection can be achieved with permanent joining methods such as welding, which permanently join the surfaces of individual components together to create a single component which cannot be separated into the original individual components without considerable damage. An integral connection can also be achieved during the production of the bearing housing. In this case, the mold comprises both the shape of the bearing housing as well as the shape of the yoke.

Alternatively, the yoke can be a separate part of the bearing housing. In this case, the yoke is releasably connected to the bearing housing by a semi-permanent joining method, such as bolts, rivets, screws or other known joining methods. For example, the yoke can be mounted on the bearing housing by a nut-bolt connection.

According to an embodiment of the invention, the fastening means is a bolt, screw, pin, rivet, thread or stud. Hence, the first coupling part and the second coupling part of the coupling assembly can be coupled by a bolt, screw, pin, rivet, thread, stud or other longitudinal fastener used for fastening.

According to an embodiment of the invention, the torque transmitting coupling assembly is arranged at a drive train of the wind turbine.

According to an embodiment of the invention, the first coupling part is the main shaft of a main bearing of the drive train.

According to an embodiment of the invention, the second coupling part is the gearbox input shaft of a gearbox of the drive train and the second coupling part housing is the gearbox housing.

According to an embodiment of the invention, the bearing housing is rigidly mounted on a bed frame of a nacelle of the wind turbine.

According to an embodiment of the invention, the first bearing is fitted in a first seat at the bearing housing and the second bearing is fitted in a second seat at the bearing housing.

According to an embodiment of the invention, the first bearing is fitted in a third seat at the first coupling part and the second bearing is fitted in a fourth seat at the first coupling part.

According to an embodiment of the invention, the first and second bearings are roller bearings comprising a plurality of rolling elements.

According to another aspect of embodiments of the invention, the drive train of a wind turbine comprises a main bearing and a gearbox, wherein the main bearing and the gearbox are coupled by a torque transmitting coupling assembly.

According to an embodiment of the invention, the first bearing and the second bearing are arranged at the main bearing, wherein the first bearing is a front bearing and the second bearing is a rear bearing, wherein the plurality of coupling flanges are arranged on the radial outer part of the rear bearing. This is particularly advantageous because this arrangement allows a coplanar torque distribution at the rear bearing, thus considerably reducing the parasitic loads.

According to an embodiment of the invention, the gearbox housing comprises two coupling flanges suspended onto four resilient means for mitigating and damping the displacements of the gearbox. In this embodiment, each coupling flange is surrounded at least partially by the respective yoke, wherein the resilient means are arranged at two opposing sides of each coupling flange. In an embodiment, the four resilient means are four rubber springs.

This embodiment is particularly useful for current state of the art design of drive trains, as the current design does not allow for any lateral growth of the drive train due to the difficulties in transporting and hoisting the nacelle, which increases in size when the drive train grows laterally. In an embodiment, the two coupling flanges are arranged at the upper and lower part of the gearbox housing respectively, so that the drivetrain only grows in height but not laterally, thereby allowing a more compact drivetrain and a smaller nacelle while at the same time being able to transfer higher loads with the drive train.

BRIEF DESCRIPTION

Some of the embodiments will be described in detail, with references to the following Figures, wherein like designations denote like members, wherein.

DETAILED DESCRIPTION

Figure 1:
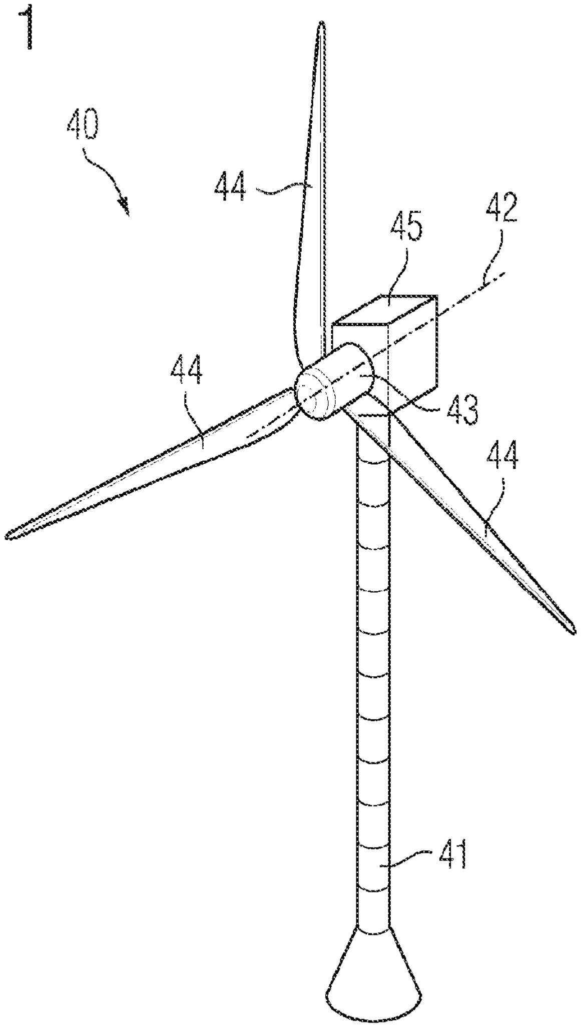
FIG. 1 shows a perspective view of a wind turbine.

FIG. 1 shows a wind turbine 40. The wind turbine 40 comprises a hub 43 connected to a generator (not shown) arranged inside a nacelle 45. The hub 43 comprises three wind turbine blades 44. The nacelle 45 is arranged at an upper end of a tower 41 comprising multiple tower sections. A longitudinal axis 42 passing through the nacelle 45 and the hub 43 is shown as a broken line.

Figure 2:
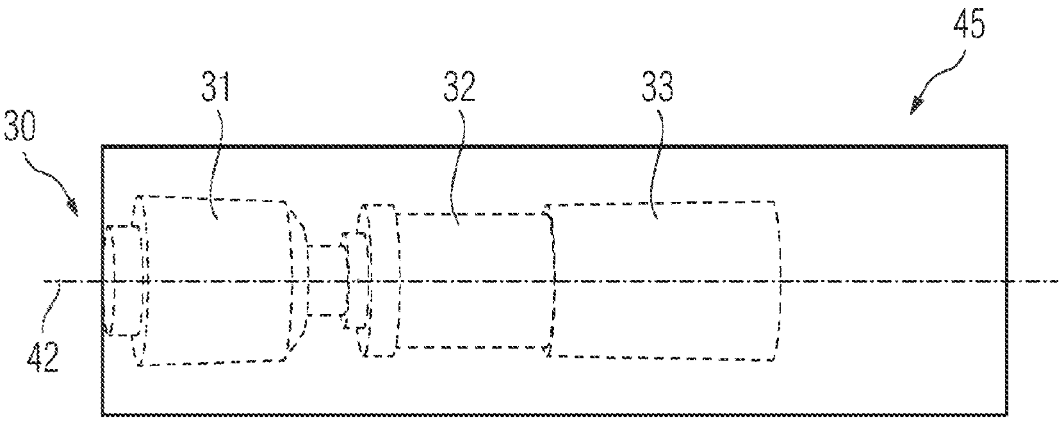
FIG. 2 shows a drive train inside a nacelle.

FIG. 2 shows a drive train 30 inside a nacelle 45. There are two main types of wind turbines 40, the ones with a gearbox 32 and direct drive gearless wind turbines 40. Here, a drive train 30 comprising a gearbox 32 is shown, but drive trains 30 without a gearbox 32 for direct drive gearless wind turbines 40 are also suitable for embodiments of the invention.

The drive train 30 comprises a main bearing 31, a gearbox 32 and a generator 33 arranged along the longitudinal axis 42 passing through the nacelle 45.

Figure 3:
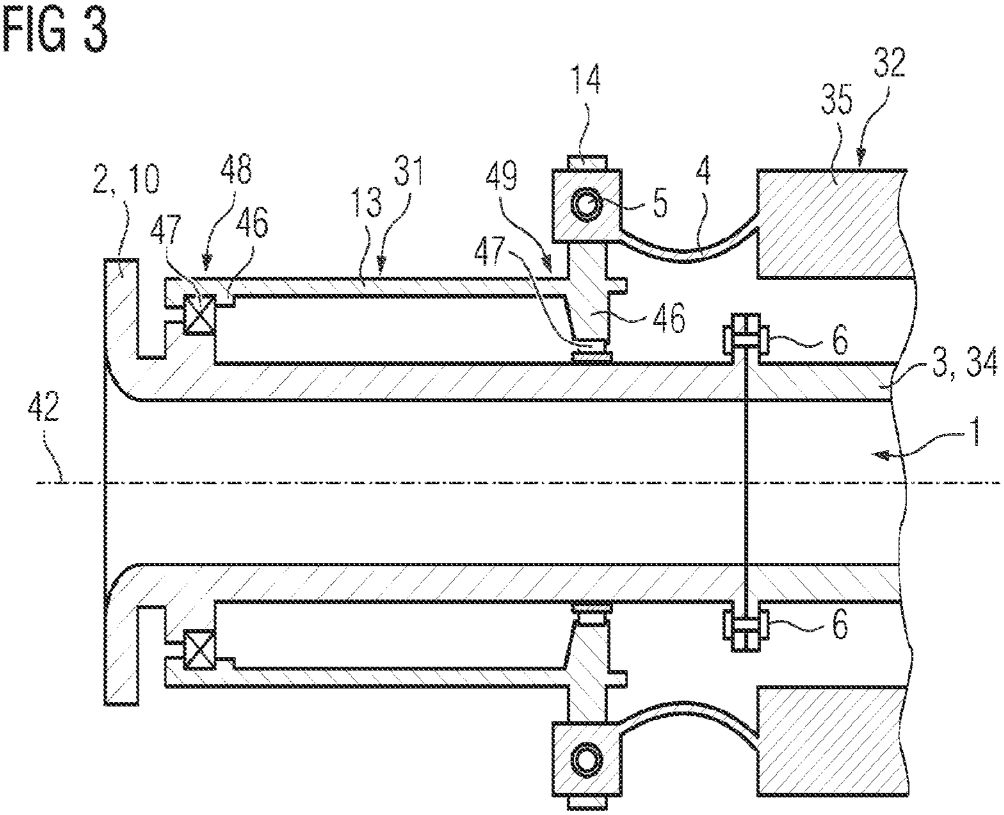
FIG. 3 shows a cross-sectional view of a part of the drive train.

FIG. 3 shows parts of the drive train 30 including the main shaft 10, which is the first coupling part 2 of the torque transmitting coupling assembly 1, and the gearbox input shaft 34, which is the second coupling part 3 of the torque transmitting coupling assembly 1.

The longitudinal axis 42 is the rotational axis of the main shaft 10 and the gearbox input shaft 34, which is also the rotational axis of the rotor, to which the blades 44 are coupled.

The main shaft 10 is at a first end, i.e., at the left of FIG. 3, provided with a rotor attachment flange to rigidly connect the main shaft 10 to the hub 43, for example by bolts. In other embodiments, the main shaft 10 may be coupled to the hub 43 by a hirth connection, a combined pin bolt connection, or some other arrangement that ensures the transfer of torque. Furthermore, although the rotor attachment flange is shown as being formed integrally with the rest of the main shaft 10, it may alternatively be a separate component bolted or otherwise secured to the main shaft 10.

At a second end, i.e., at the right of FIG. 3, the main shaft 10 is connected to the gearbox input shaft 34 by a plurality of fastening means 6 so that the main bearing 31 is coupled to the gearbox 32. Hence, the first coupling part 2 and the second coupling part 3 are rigidly connected to each other by the fastening means 6.

Figure 4:
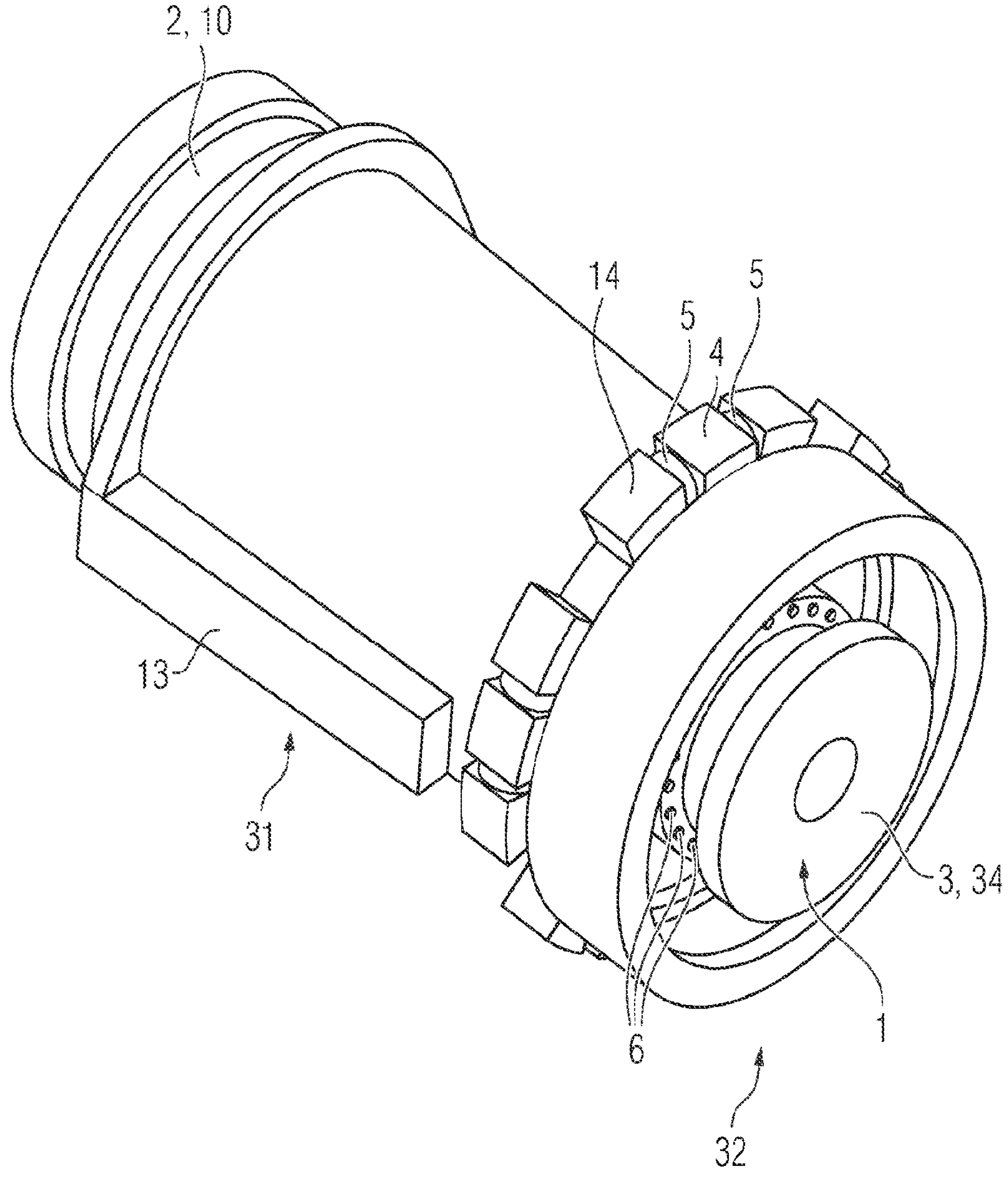
FIG. 4 shows a perspective view of the drive train shown in FIG. 3.

The main shaft 10 is carried via the main bearing 31 and supported by the bearing housing 13. The bearing housing 13 encloses the main shaft 10 and extends substantially in parallel with the longitudinal axis 42. The bearing housing 13 is rigidly mounted on a bed frame of the nacelle structure by a flange provided with holes, as can be seen in FIG. 4.

The main bearing 31 comprises a first bearing 48 and a second bearing 49 distributed along the longitudinal axis 42 of the main shaft 10 to support the rotation of the main shaft 10 along the longitudinal axis 42. The first and second bearings 48, 49 are in the embodiment shown in FIG. 3 roller bearings 46 comprising rolling elements 47, but any of them could alternatively be any other type of bearing, such as a fluid film bearing.

The first bearing 48 is located closer to the hub 43 than the second bearing 49. The first bearing 48, or more specifically, an outer ring of the first bearing 48, is fitted in a first seat at the bearing housing 13. The second bearing 49 is located closer to the gearbox 32 than the first bearing 48. An outer ring of the second bearing 49 is fitted in a second seat at the bearing housing 13. Inner rings of the first and second bearings 48, 49 are fitted in respective seats at the main shaft 10.

The bearing housing 13 is connected to the gearbox housing 35 by a flexible coupling. This flexible coupling surrounds the interface between the main shaft 10 and the gearbox input shaft 34 and comprises a plurality of coupling flanges 4, each of the coupling flanges 4 coupled to a yoke 14 of the bearing housing 13 by a resilient means 5.

FIG. 4 shows a perspective view of the drive train 30 shown in FIG. 3. As shown in FIG. 3, the gearbox housing 35 is coupled by a plurality of coupling flanges 4 to the bearing housing 13.

Figure 5:
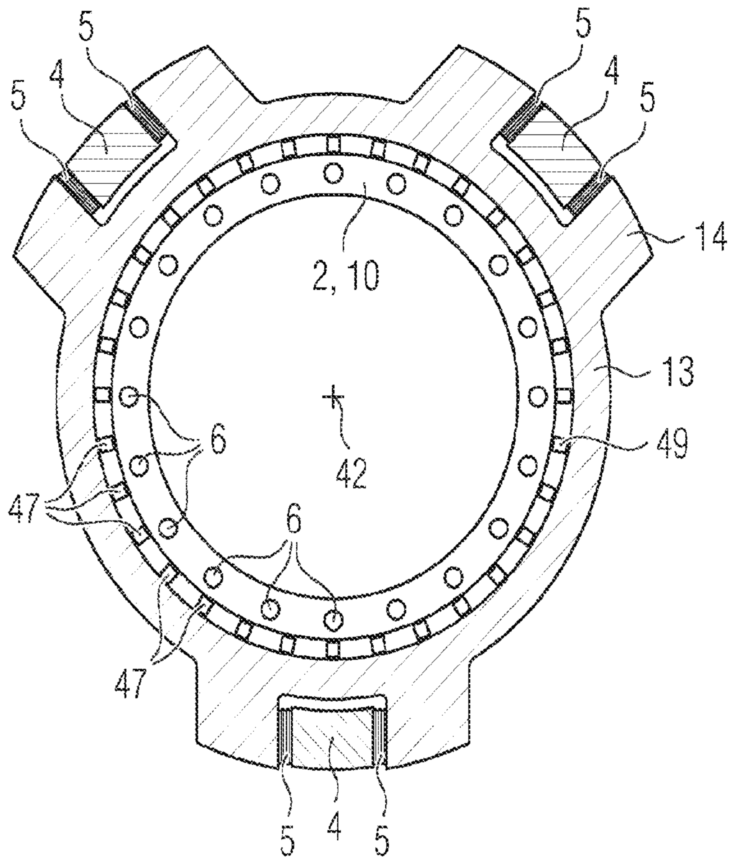
FIG. 5 shows a cross-sectional view of the coupling interface between the first coupling part and the second coupling part.

FIG. 5 shows a cross-sectional view of the coupling interface between the first coupling part 2 and the second coupling part 3. As can be seen in this figure, each coupling flange 4 is partially surrounded by the respective yoke 14. The resilient means 5 are arranged at two opposing sides of each coupling flange 4 and the coupling flanges 4 are distributed at a radial distance from the longitudinal axis 42.

The yokes 14 are formed as an integral part of the bearing housing 13. The bearing housing 13 is supported by the bearing 49, which is a roller bearing 46 comprising a plurality of rolling elements 47.

In this cross-sectional view, the main shaft 10 can be seen, which is the first coupling part 2 being coupled to the second coupling part 3, which is the gearbox input shaft 34. The main shaft 10 comprises a plurality of fastening means 6 configured as bolts.

Figure 6:
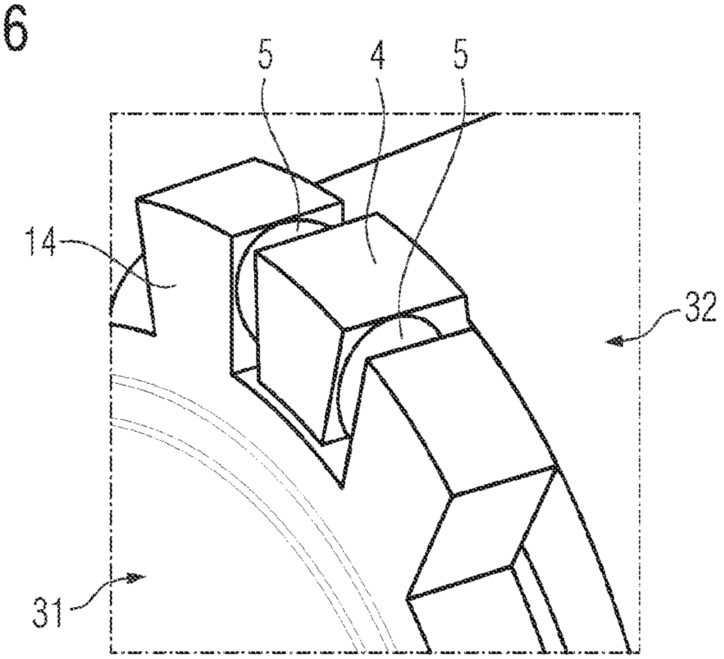
FIG. 6 shows a perspective view of the flexible coupling of the torque transmitting coupling assembly.

FIG. 6 shows a perspective view of the flexible coupling of the torque transmitting coupling assembly 1. As seen in FIG. 5, each coupling flange 4 is partially surrounded by the respective yoke 14, which comprises two yoke flanges extending in radial direction for surrounding the coupling flanges 4. Resilient means 5 are arranged between each yoke flange and each coupling flange 4.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or "module" does not preclude the use of more than one unit or module.

REFERENCE NUMBERS

1 Torque transmitting coupling assembly
2 First coupling part
3 Second coupling part
4 Coupling flange
5 Resilient means
6 Fastening means
10 Main shaft
13 Bearing housing
14 Yoke
30 Drive train
31 Main bearing
32 Gearbox
33 Generator
34 Gearbox input shaft
35 Gearbox housing
40 Wind turbine
41 Tower
42 Longitudinal axis
43 Hub
44 Blade
45 Nacelle
46 Roller bearing
47 Rolling element
48 First bearing
49 Second bearing

The invention claimed is:

1. A torque transmitting coupling assembly for a wind turbine comprising a first coupling part and a second coupling part, wherein the torque transmitting coupling assembly is configured to couple the first coupling part to the second coupling part, wherein the first coupling part and the second coupling part are configured to rotate about a longitudinal axis of the torque transmitting coupling assembly, wherein the first coupling part is supported by a first bearing and a second bearing distributed along the longitudinal axis, wherein the first coupling part is enclosed by a bearing housing and the first and second bearings are arranged between the first coupling part and the bearing housing, wherein the second coupling part is enclosed by a second coupling part housing, wherein the first coupling part and the second coupling part are rigidly coupled by a plurality of fastening means, wherein the bearing housing is coupled to the second coupling part housing by a plurality of coupling flanges, wherein each coupling flange is coupled to the bearing housing by a resilient means.

2. The torque transmitting coupling assembly according to claim 1, wherein the bearing housing comprises a yoke for each coupling flange for coupling the coupling flange to the bearing housing.

3. The torque transmitting coupling assembly according to claim 1, wherein the resilient means is a spring, a belleville washer, a coil spring, or a disc.

4. The torque transmitting coupling assembly according to claim 1, wherein the resilient means comprises a plurality of springs.

5. The torque transmitting coupling assembly according to claim 2, wherein each coupling flange is surrounded at least partially by the respective yoke, wherein the resilient means are arranged at two opposing sides of each coupling flange.

6. The torque transmitting coupling assembly according to claim 2, wherein the yokes are formed as an integral part of the bearing housing.

7. The torque transmitting coupling assembly according to claim 1, wherein the fastening means is a bolt, screw, pin, rivet, thread, or stud.

8. The torque transmitting coupling assembly according to claim 1, wherein the torque transmitting coupling assembly is arranged at a drive train of the wind turbine.

9. The torque transmitting coupling assembly according to claim 8, wherein the first coupling part is the main shaft of a main bearing of the drive train of the wind turbine.

10. The torque transmitting coupling assembly according to claim 8, wherein the second coupling part is the gearbox input shaft of a gearbox of the drive train of the wind turbine and the second coupling part housing is the gearbox housing.

11. The torque transmitting coupling assembly according to claim 8, wherein the bearing housing is rigidly mounted on a bed frame of a nacelle of the wind turbine.

12. The torque transmitting coupling assembly according to claim 1, wherein the first bearing is fitted in a first seat at the bearing housing and the second bearing is fitted in a second seat at the bearing housing.

13. The torque transmitting coupling assembly according to claim 12, wherein the first bearing is fitted in a third seat at the first coupling part and the second bearing is fitted in a fourth seat at the first coupling part.

14. A drive train of a wind turbine comprising a main bearing and a gearbox, wherein the main bearing (and the gearbox are coupled by means of a torque transmitting coupling assembly according to claim 1.

15. The drive train according to claim 14, wherein the first bearing and the second bearing are arranged at the main bearing, wherein the first bearing is a front bearing and the second bearing is a rear bearing, wherein the plurality of coupling flanges are arranged on the radial outer part of the rear bearing.

* * * * *